United States Patent [19]

Parulski et al.

[11] Patent Number: 5,270,831
[45] Date of Patent: Dec. 14, 1993

[54] STORAGE AND PLAYBACK OF DIGITIZED IMAGES IN DIGITAL DATABASE TOGETHER WITH PRESENTATION CONTROL FILE TO DEFINE IMAGE ORIENTATION/ASPECT RATIO

[75] Inventors: Kenneth A. Parulski; Scott A. Brownstein, both of Rochester; Holden R. Caine, Pittsford; Michael S. Axman, W. Henrietta, all of N.Y.

[73] Assignee: Eastman Kodak Company, Rochester, N.Y.

[21] Appl. No.: 583,265

[22] Filed: Sep. 14, 1990

[51] Int. Cl.⁵ .............................................. H04N 1/21
[52] U.S. Cl. ................................... 358/403; 358/488; 395/102
[58] Field of Search .......... 358/488, 76, 403; 382/46, 47; 395/102, 109

[56] References Cited

U.S. PATENT DOCUMENTS

| Re. 33,316 | 8/1990 | Katsuta et al. | 395/155 |
|---|---|---|---|
| 4,222,076 | 9/1980 | Knowlton | 358/470 |
| 4,496,983 | 1/1985 | Takenaka | 358/77 |
| 4,614,977 | 9/1985 | Kawahara et al. | 358/448 |
| 4,641,198 | 2/1987 | Ohta et al. | 358/448 |
| 4,642,700 | 2/1987 | Ohta et al. | 358/448 |
| 4,672,444 | 6/1987 | Bergen et al. | 358/140 |
| 4,700,237 | 10/1987 | Yoshioka et al. | 358/451 |
| 4,742,558 | 5/1988 | Ishibashi et al. | 382/56 |
| 4,751,583 | 7/1988 | Levine | 358/75 |
| 4,768,099 | 8/1988 | Mukai | 358/403 |
| 4,788,578 | 11/1988 | Tamura et al. | 358/451 |
| 4,829,370 | 5/1989 | Mayne et al. | 358/78 |
| 4,829,453 | 5/1989 | Katsuta et al. | 395/155 |
| 4,967,266 | 10/1990 | Yamamoto | 358/76 |
| 5,027,197 | 6/1991 | Endo | 358/76 |

FOREIGN PATENT DOCUMENTS 0225677 12/1984 Japan ..................... 358/448

Primary Examiner—Edward L. Coles, Sr.
Assistant Examiner—Jill Jackson
Attorney, Agent, or Firm—Edward Dugas

[57] ABSTRACT

A digital image processing system digitizes and stores photographic film images in their captured orientation on film, in order to obviate the need to physically rotate the film scanner relative to the film for vertical images, thereby significantly reducing the complexity and cost of the scanner. Instead, each stored image file has an associated presentation control file, which contains orientation and aspect ratio information, so that the image playback device will know how each image has been stored on the digital image database, such as a compact disc. When the disc is inserted into a playback device for driving an output display such as a color TV monitor, the playback device is readily able to decode the playback control information in the course of reading out the digitized image, so that the image will be displayed in an upright orientation and at the correct aspect ratio for the display.

44 Claims, 5 Drawing Sheets

STORAGE AND PLAYBACK OF DIGITIZED IMAGES IN DIGITAL DATABASE TOGETHER WITH PRESENTATION CONTROL FILE TO DEFINE IMAGE ORIENTATION/ASPECT RATIO

FIELD OF THE INVENTION

The present invention relates in general to digitized image data processing systems and is particularly directed to a mechanism for controlling the manner in which digitized images are to be accessed from a digital database for presentation by an image playback device.

BACKGROUND OF THE INVENTION

Digital imaging systems, such as those employed for converting still color photographic film (e.g. 35 mm) images into digital format for storage in a digital database and subsequent playback, as by way of a color television monitor, customarily encode the output of an opto-electronic film scanning device to some prescribed resolution and store the encoded image in an associated database as a respective image file. When it is desired to display a particular stored image, the contents of the respective addresses of the database in which the digitized image has been stored are read out and coupled to display driver circuitry for energizing corresponding pixels on the TV monitor.

Because each frame of a typical roll of 35 mm film has different horizontal and vertical frame dimensions, for example a dimension of 36 mm in the horizontal direction, parallel to the lengthwise direction of the film, and a dimension of 24 mm in the vertical direction, orthogonal to the lengthwise direction of the film (a horizontal:-vertical aspect ratio of 3:2), a photographer often rotates the camera ninety degrees about the lens axis in order to capture a subject in what is conventionally referred to as a 'vertical' condition. Since the digitizing mechanism that scans the film strip digitizes each frame as though it contains a 'horizontally shot' image, then, when a 'vertically shot' image is displayed, it will be rotated unless the recording and playback system has been designed to accommodate vertical images.

One conventional approach to handle the problem, similar to that described in the U.S. Pat. No. to Ohta, No. 4,641,198, is to rotate those film frames which contain vertical images by ninety degrees before scanning and to fill in the left and right sides of the image with a uniform 'border' color (e.g. black). Although this scanning method will provide the proper orientation of the displayed image, it suffers from two drawbacks. First, the actual scanning mechanism must be modified to effect a rotated scan of the vertical images. This is conventionally accomplished by physically reorienting the film by ninety degrees and changing the lens magnification of the scanning device by an amount related to the frame aspect ratio. Secondly, since side borders, which contain no useful information in terms of the captured image, are also recorded, some of the information storage capacity of the recording medium is wasted. A second solution to the problem is to rotate the display device, which is obviously impractical in many applications.

A third solution is to allow for different image orientations to be stored, together with digital control data indicative of the orientations of the images, and to employ an image playback device designed to read the orientation control data to properly orient the images on playback. Some conventional computer image file formats, for example, the Tag Image File Format (TIFF), Revision 5.0, developed jointly by Aldus Corporation, Seattle, Washington, and Microsoft Corporation, Redmond, Washington, and described in "An Aldus/Microsoft Technical Memorandum, Aug. 8, 1988, include the provision for an optional "tag", which can be used to indicate the orientation of the image. Page 25 of this document describes the TIFF 'orientation tag', which can have eight different values, indicating whether the zeroth row and zeroth column of the pixel data matrix represents the top and left, top and right, bottom and right, bottom and left, left and top, right and top, right and bottom, or left and bottom of the visual image, respectively. However, the Aldus document further states that such a field is recommended for private (non-interchange) use only. The default condition, where the zeroth row represents the visual top of the image, and the zeroth column of the pixel data matrix represents the visual left hand side of the image, is recommended for all non-private applications, including those involving importing and printing. Thus, the TIFF orientation tag is never used to re-orient for display images which have been stored in different orientations in an image database.

In addition to the problem of different image orientations, captured images may have different aspect ratios. For example, dedicated use panoramic cameras, such as the Kodak Stretch (TM) camera have an aspect ratio of 3:1 which is considerably wider than the above-referenced 3:2 aspect ratio of conventional 35 mm cameras. Other camera types, such as those which employ 126 type film also have aspect ratios other than 3:2.

SUMMARY OF THE INVENTION

In accordance with the present invention, advantage is taken of the information storage capability of the database in which the digitized images are stored to incorporate an additional presentation control file for each stored image. This presentation control file contains orientation and aspect ratio information, so that the image playback device will know how each image has been stored on the database and will therefore know how to access the stored image so that it is played back in a proper upright condition.

More particularly, the present invention is directed to an improved storage and retrieval mechanism for a digital image processing system wherein a plurality of photographic images that have been captured on a photographic film strip are digitized for processing and subsequent display. The film strip can be expected to include both horizontally-shot (whether upright or inverted) and vertically-shot (in either a right or left hand rotation) images. Digitized images are stored on a digital data storage recording medium, such as a compact disc, which is capable of being coupled to an image playback device for reproduction of a digitized image on a display such as a color TV monitor.

Pursuant to the present invention, rather than cause a relative physical rotation between film strip and the digitizing scanner, each image on the film strip is scanned and digitized as though it were horizontally oriented, irrespective of its actual orientation on the film. The digitized image is entered into a frame store and displayed on a display monitor of a system workstation, so that the image may be viewed by the operator. Using a workstation input device (e.g. keyboard or mouse) the operator may then enter a set of 'presentation' control codes that are incorporated within a presentation control file associated with a respective image file. These presentation control codes preferably include a first digital code representative of the orientation in which the image is currently displayed (corresponding to its orientation as digitized from the film strip) and a second digital code representative of its aspect ratio. Once all control information relative to the image has been defined, both the digitized image and its presentation control file are written to a portable storage medium, such as a write once optical disc.

Subsequently, when the disc is inserted into a playback device for driving an output display such as a color TV monitor, the playback device decodes the presentation control file information in the course of reading out the digitized image, and uses the presentation control file to control the playback device in such a way as to display the image in an upright orientation and at the correct aspect ratio for the display. A border generator fills in non-accessed pixel addresses to complete the image on the display. In addition to responding to presentation control file orientation and aspect ratio codes, the playback apparatus may respond to user-generated control signals for defining the limits of an auxiliary border to be injected onto the displayed image, so that cropping of selected portions of an image may be controlled by the user.

DETAILED DESCRIPTION

Figure 1:
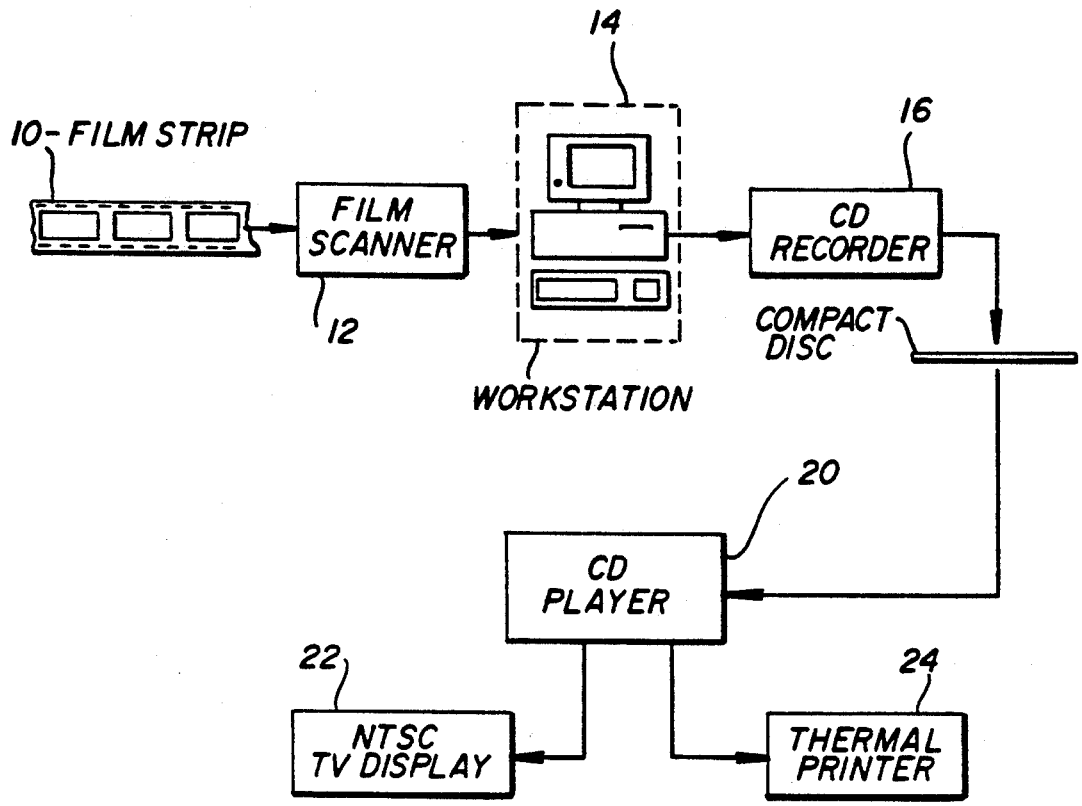
FIG. 1 diagrammatically illustrates a photographic color film processing system in which the present invention may be employed.

Before describing in detail the particular improved digital image storage and retrieval mechanism in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the FIGS. do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates a photographic color film processing system in which the present invention may be employed. For purposes of the present description such a system may be of the type described, for example, in co-pending U.S. Pat. application Ser. No. 582,305, filed Sept. 14, 1990, by S. Kristy, entitled "Multiresolution Digital Imagery Photofinishing System," assigned to the assignee of the present application and the disclosure of which is incorporated herein. However, it should be observed that the system described in the above-referenced co-pending application is merely an example of one type of system in which the invention may be used and is not to be considered limitative of the invention. In general, the invention may be incorporated in any digitized image processing system.

In accordance with the digital image processing system of FIG. 1, photographic images, such as a set of twenty-four or thirty-six 36 mm×24 mm image frames of a 35 mm film strip 10, are scanned by a high resolution opto-electronic film scanner 12, such as a commercially available Eikonix Model 1435 scanner. Scanner 12 outputs digitally encoded data (e.g. a 3072×2048 pixel matrix) representative of the internal electronic scanning of a high resolution image sensing array onto which a respective photographic image frame of film strip 10 is projected. This digitally encoded data, or 'digitized' image, is coupled in the form of an imaging pixel array-representative bit map to an attendant image processing workstation 14, which contains a frame store and image processing application software through which the digitized image may be processed (e.g. enlarged, rotated, cropped, subjected to scene balance correction, etc.) to achieve a desired image appearance. Once an image file has been prepared, it is stored on a transportable medium, such as a write-once optical compact disc, using an optical compact disc recorder 16, for subsequent playback by a disc player 20, which allows the image to be displayed, for example, on a relatively moderate resolution consumer television set 22 (e.g. having an NTSC display containing and array of 485 lines by 640 pixels per line), or printed as a finished color print, using a high resolution thermal color printer 24.

In accordance with the image processing system described in the above referenced co-pending application, each high resolution captured image is stored as a respective image data file containing a low, or base, resolution image bit map file and a plurality of higher resolution residual image files associated with respectively increasing degrees of image resolution. By iteratively combining the higher resolution residual image file data with the base resolution bit map image, successively increased resolution images may be recovered from the base resolution image for application to a reproduction device, such as a color monitor display or hard copy printer.

As an example, and as described in the above-referenced co-pending application, spatial data values representative of a high resolution 3072×2048 (3K×2K) image scan of a 36 mm-by-24 mm image frame of a 35 mm film strip 10 may be stored as a respective image data file including a base resolution image bit map file containing data values associated with a spatial image array of 512 rows and 768 columns of pixels and an associated set of residual image files to be stored on the disc. Within the workstation itself, the base resolution image may be further subsampled to derive an even lower resolution sub-array of image values (e.g. on the order of 128×192 pixels) for display on a segment of the system operator's workstation for the purpose of identifying image orientation and specifying aspect ratio.

As pointed out above, the present invention takes advantage of the information storage capability of the compact disc to incorporate, within a header file associated with each digitized image, additional presentation control files for each stored image for the purpose of specifying how the image was captured on film and has been correspondingly digitized and stored on disc, so that, when played back, the image will have an upright orientation and the correct aspect ratio for the display device.

Figure 2:
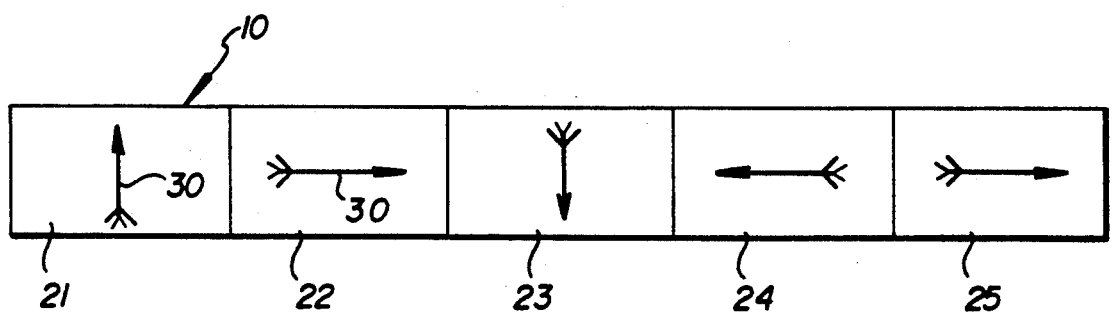
FIG. 2 diagrammatically illustrates a portion of a film strip that contains a plurality of successive image frames on each of which an image of an arrow has been recorded.

FIG. 2 diagrammatically illustrates a portion of a film strip 10 that contains a plurality of successive image frames 21...25, on each of which an image of an arrow 30 has been recorded. In frame 21 the arrow has been recorded with the camera held by the photographer in its normal horizontal position. In frame 22 the arrow has been recorded with the camera held by the photographer in its normal vertical position, rotated counter-clockwise 90° relative to its normal horizontal position. In frame 23 the arrow has been recorded with the camera held by the photographer in its flipped or inverted horizontal vertical position, rotated 180° relative to its normal horizontal position. In frame 24 the arrow has been recorded with the camera held by the photographer in its flipped vertical position, rotated clockwise 90° relative to its normal horizontal position. In frame 25 the arrow has been recorded with the camera held by the photographer in its normal vertical position.

While not every strip of film will necessarily contain images at each of the orientations shown in FIG. 2, a typical film strip can be expected to include both horizontally-shot (whether upright or inverted) and vertically-shot (either right or left hand rotation) images. In accordance with the present invention, rather than physically rotate either the film strip or the digitizing scanner, each image on the film strip is scanned and digitized as though it were horizontally oriented, irrespective of its actual orientation on the film. The digitized image is then stored in the workstation's frame store, as is, and a lower resolution version of the digitized image is then displayed on the display monitor of workstation 14, so that the image may be viewed by the operator. Then, as each image is digitized and stored, the system operator, using a workstation input device (e.g. a keyboard or mouse) enters a set of 'presentation' control codes that are incorporated within a presentation control file associated with each respective image file.

Figure 3:
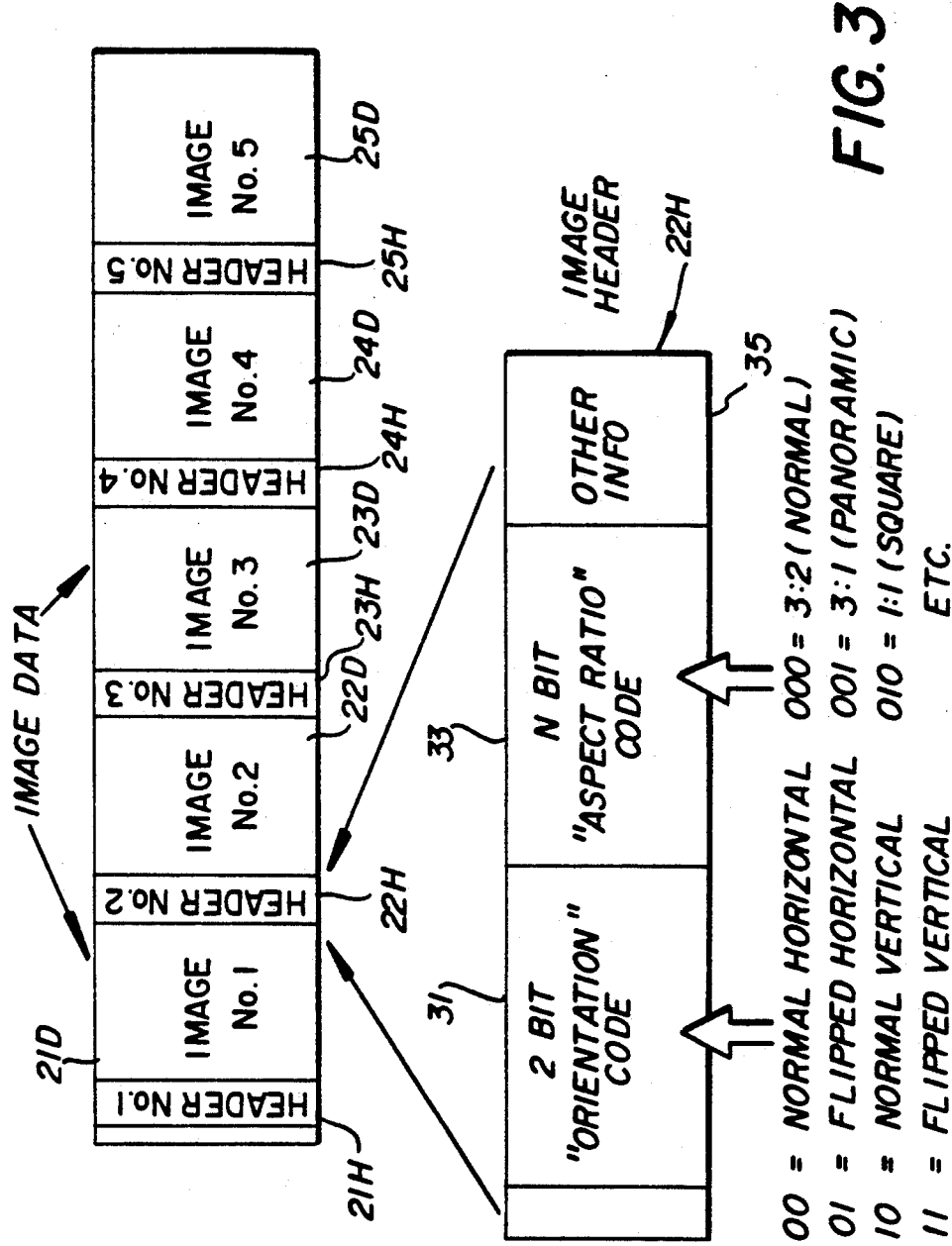
FIG. 3 shows the format of a header file.

The format of a presentation control file, such as header file 22H associated with image data file 22D, into which normal vertical image frame 22 on film strip 10 has been digitized by scanner 12, is shown in FIG. 3 as comprising an M-bit orientation filed 31, and N-bit aspect ratio field 33 and a supplemental field 35, in which additional information, such as title, date, etc. may be inserted by the operator in the course of formatting a digitized image for storage on the disc. For the four possible image orientations described above and depicted in FIG. 2, M=2 bits are required for the orientation field 31. The code width of aspect ratio field 33 depends upon the number of allowable image aspect ratios; providing a three bit code width will accommodate up to eight different aspect ratios. It should be observed that the parameters and field formats given here are merely for purposes of illustration and are not to be considered limitative of the invention. As in any data processing application what is required is that the actual coding structure and data format of the header field be capable of being read and interpreted by the underlying control mechanism in the reproduction device. Rather than describe the coding details of that mechanism, the description to follow will set forth the architecture of the storage and retrieval mechanism and the manner in which it processes images having a variety of orientations and aspect ratios.

Figure 4:
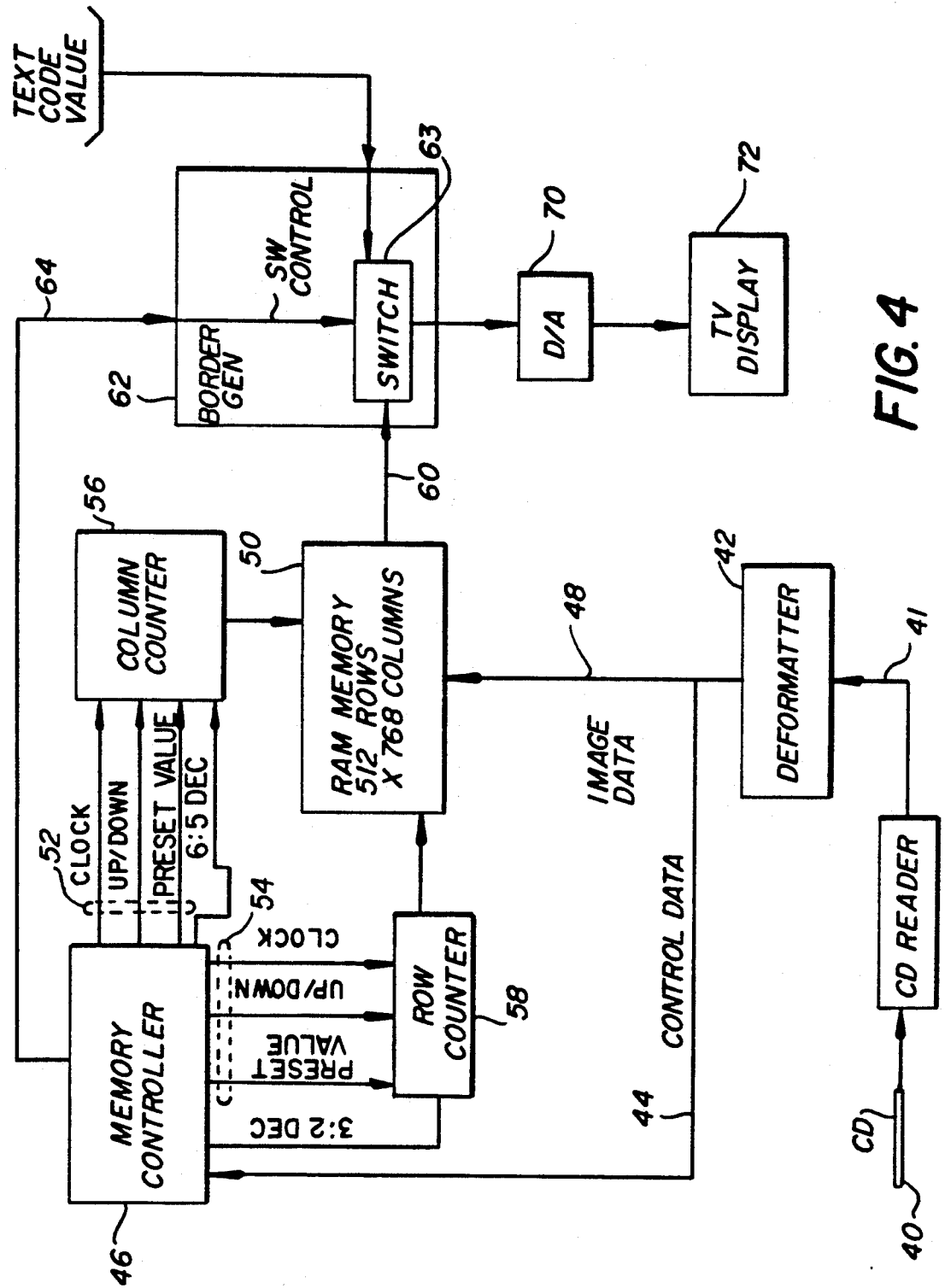
FIG. 4 diagrammatically illustrates the signal processing architecture of an image retrieval mechanism in accordance with the present invention.

FIG. 4 diagrammatically illustrates the signal processing architecture of an image retrieval mechanism in accordance with the present invention, which may be incorporated in a commercially available digital data storage and retrieval device, such as a compact disc player, for supplying video signals to an associated display device, such as a color television monitor. As shown in the figure, data read from a disc 40 is coupled over input bus 41 to a deformatter 42, which separates the control data (the header field) from the (512×768) data. The header data is coupled over link 44 to a memory controller 46, while the image data is coupled over link 48 to a random access memory 50 the storage capacity of which corresponds to the size of the base resolution image (512×768 pixels) stored on the disc.

Memory read out controller 46 may be incorporated as part of the CD player's microcontroller or may be a separate dedicated combinational logic circuit driven by the microcontroller for controlling the generation of read out address/clock signals which are supplied over respective address bus links 52 and 54 to a set of associated column and address counters 56 and 58, respectively, for controlling the rate and order in which contents of memory 50 are accessed.

In particular, the "clock" signal lines allow counters 56 and 58 to be incremented (when the up/down signal is asserted) or decremented (when the up/down signal is not asserted), the "preset value" lines allow the counters to be preset to the value indicated by these lines, and the "3:2 decimate" line instructs the counters to skip over every third value (i.e. to provide addresses 0, 1, 3, 4, 6, 7, 9, 10, etc.) and the "6:5 decimate" line instructs the counters to skip every sixth value (i.e. to provide addresses 0, 1, 2, 3, 4, 6, 7, 8, 9, 10, 12, 13, etc.).

As pointed out previously, each field of image data for a respective digitized image is formatted as though the image is a normal horizontal image and when downloaded from the disc into memory 50, the image data is simply written directly into memory 50 in this format. The manner in which the image is read out from memory 50 in accordance with the contents of its associated header determines the orientation and display of the image on an associated display device (TV monitor). When image data is read out from memory 50, it is coupled over link 60 to a border generator 62 which controllably substitutes for the pixel code values accessed from memory 50 an alternate code value, representative of a prescribed border color (e.g. black). For this purpose, border generator 62 preferably comprises a multiplexer switch 63 which connects the digital-to-analog converter 70 to either receive the pixel code data values from memory 50, or to instead receive a "border" code value representing a prescribed border color. The position of multiplexer switch 63 is controlled by the control signal on link 64 from memory controller 46. In this way, border generator 62 selectively injects 'border' pixel values, as instructed by memory controller 46, which fills in border regions of the 512×768 image array, for the image files where the aspect ratio code within the header field specifies that the size and shape of the image being read out from memory should occupy less than the entirety of the display. The resulting combined image and border data is then output to digital-to-analog converter 70 for application to a display device, such as a color TV monitor, so that a reproduction of the original 35 mm image will be presented to the viewer.

Because conventional television monitors customarily employ a display screen having a 4:3 aspect ratio (and having 484 lines for an NTSC system), then, irrespective of the orientation of the 3:2 aspect ratio image stored in memory 50, the accessing of memory 50 will require some degree of cropping or decimation of the contents of the 512×768 array. The manner in which memory controller 46 controls the generation of address signals and clocks out the contents of memory 50 for a number of respectively different image types for the example of an NTSC system television monitor is illustrated in FIGS. 5-9.

Figure 5:
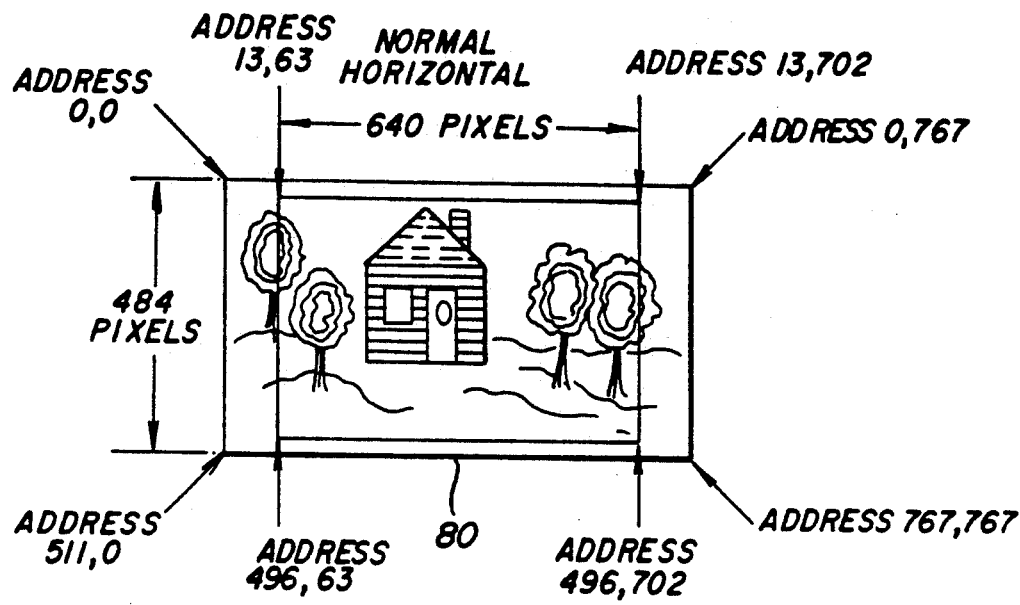
FIG. 5 illustrates the overlay of a rectangular perimeter frame sized to an NTSC TV monitor on a pixel array represented by the contents of the image memory of FIG. 4 for a horizontal normal image.

More particularly, FIG. 5 illustrates the overlay of a rectangular perimeter frame 80, the size and shape of which effectively correspond to a 484 row by 640 column pixel array that substantially matches the 484×640 "square pixel" display capacity of an NTSC TV monitor, 'centered' on a 512×768 pixel array represented by the contents of memory 50 for a horizontal normal image, where the contents of the image correspond to an 'upright' picture. Since, for either an upright (normal) or inverted horizontal image, the size of the stored image exceeds the size of the NTSC display matrix, memory controller 46 confines its column and row output addresses to a set of boundaries that encompasses a 484×640 sub-matrix of addresses centered in frame 80 within memory array 50.

In particular, frame 80 encompasses those pixels of the 512×768 pixel array bounded by addresses Y=13, X=63; Y=13, X=702; Y=496, X=702, where "Y" is the row address and "X" is the columns address. Those data entries of memory 50 that fall outside of frame 80 are not accessed for display and the associated 484×640 NTSC display will display a normal horizontal image of the pixels bounded by frame 80. For an inverted horizontal image the same 484×640 frame of addresses is accessed except that the order of read-out of the successive 484 lines is reversed from that of a normal horizontal image. For the inverted horizontal image, the pixel code value stored at address Y=496, X=63 is the first (upper left) pixel of the video frame read from memory 50, whereas pixel Y=13, X=63 is the first pixel read out from memory for a normal horizontal image. For horizontal 3:2 aspect ratio images a higher frequency pixel rate clock (approximately 12 MHz) is applied over link 52 to the column address counter 56, while a lower frequency rate (approximately 15.7 KHz) line or row clock is applied over link 54 to row address counter 58, in order to read out the image data in a line by line fashion.

It should be noted that conventional television systems such as NTSC utilize 2:1 interlaced scanning. The "odd" lines of the video image, that is lines 1, 3, 5, 7, 9, ..., 483, are scanned out during the first video field, which last approximately 1/60 second, while the "even" lines of the video image are scanned out during the next 1/60 of a second, during the second field. Therefore, in order to provide a properly interlaced signal to TV display 72 in FIG. 4, memory controller 46 provides the proper preset values on lines 54 to row counter 58 for the two fields (that is, row address 13 for the first field and row address 14 for the second field) for "normal" horizontal images, and also asserts the clock signal twice at the end of each video line, in order to increment the row count by two. Thus, the sequence of row addresses provided by row counter 58 to memory 60 is 13, 15, 17, ... 495, for field one and 14, 16, 18, ... 496 for field two for "normal" horizontal images, and 496, 494, 492, ... 14 for field one and 495, 493, 491, ... 13 for field two for "inverted" horizontal images.

Figure 6:
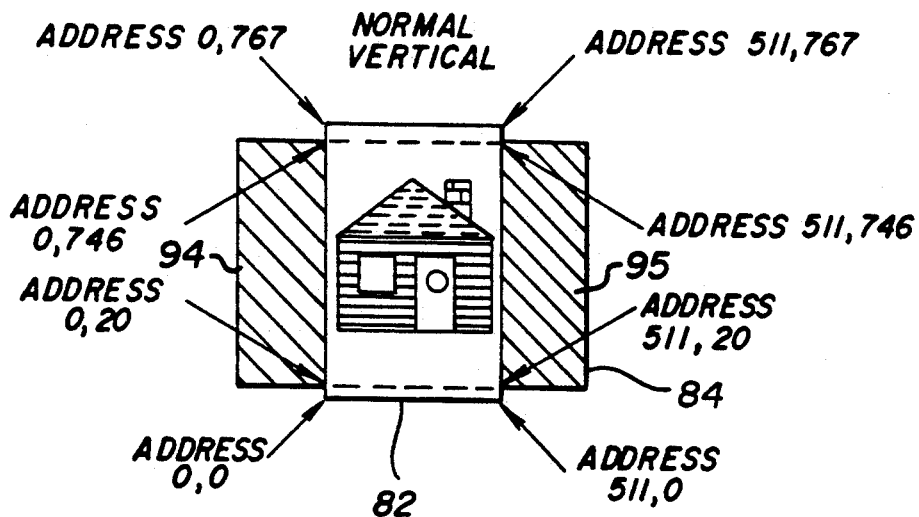
FIG. 6 illustrates a rotated rectangular perimeter frame overlay associated with a decimated sub-array portion of data entries of the image memory of FIG. 4 on an NTSC pixel matrix, where the contents of the image correspond to a 90° rotated picture that has been slightly demagnified.

FIG. 6 illustrates a rotated rectangular perimeter frame overlay 82 associated with a decimated sub-array portion of the 512×768 data entries of memory 50 on a 484×640 NTSC pixel matrix 84, where the contents of the image correspond to a 90° rotated picture that has been slightly demagnified so that most of its vertical dimension fits within the vertical boundaries of the TV display matrix. Specifically, FIG. 6 illustrates a "three-to-two" decimation of the 512×768 memory array in which the scanned addresses output by column counter 56 and row counter 58 of FIG. 4 skip every third row address and every third column address, so that the original 512×768 image is decimated, or demagnified, to a 342×512 image matrix which, when rotated 90° and centered on the 484×640 TV display matrix, allows almost the entire 768 pixel vertical content of the image to be displayed on the 484 line TV receiver with only very slight cropping (approximately three percent of picture height) of top portion 91 and bottom portion 92 of the image. Due to the decimation and rotation of the vertical image, the sides of the image are flanked by border regions 94 and 95 for which no data is available from memory 50. Consequently, when reading out the image data from memory 50, border generator 62 supplements the 342×484 sub-array of pixel values read out from memory 50 with border color representative (e.g. black) pixel values to fill in the tow 149×484 pixel side regions 94 and 95 of the displayed image. For these vertical 3:2 aspect ratio images, the lower frequency (approximately 15.7 KHz) line rate clock is applied over link 52 to the column address counter 56, while the higher frequency (approximately 12 MHz) pixel rate clock is applied over link 54 to row address counter 58, in order to read out the image data in a column by column fashion. Depending upon whether the photographer held the camera in a rotated right or left position when the vertical image was taken, the 'flipped vertical' code within the header field will cause memory controller 46 to cause the row counter to count either up or down.

Specifically, for "normal vertical" images, the pixel code value store at row Y=0 and column X=746 in memory 50 of FIG. 4 is the first (upper left) non-border pixel of the video frame read out, and the order of memory addressing is Y=0, X=746; Y=1, X=746; Y=3, X=746; Y=4, X=746; Y=6, X=746; ... Y=511, X=746; Y=0, X=743; ... Y=0, X=740; ... for field one and Y=0, X=745; ... Y=0, X=742; ... Y=0, X-739 for field two. For "flipped vertical" images, pixel Y=0, X=20 of memory 50 is read out first.

Figure 7:
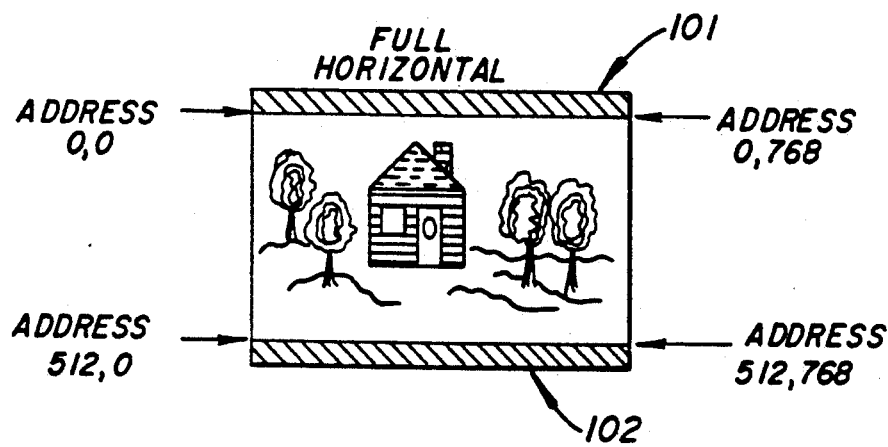
FIG. 7 illustrates the manner in which entire horizontal dimension of a stored 512×768 image may be displayed on a 484×640 pixel matrix by performing a five-sixths decimation of column and row addresses of a normal or inverted horizontal image.

FIG. 7 illustrates the manner in which the entire horizontal dimension of the stored 512×768 image may be displayed using a 484×640 pixel matrix display by performing a "six-to-five" decimation of column and row addresses of a normal or inverted horizontal image. Namely, memory controller 46 instructs column counter 56 and row counter 58 to provide column and row output addresses such that every sixth pixel and every sixth line is excluded, thereby performing a 5/6 demagnification of the full horizontal image to a 427×640 pixel sub-array. Again, in the case of an inverted horizontal image, the same 427×640 frame of addresses is accessed except that the order of read-out of the successive 427 lines is reversed from that of a normal horizontal image. Also, because of the decimation of the image, the top and bottom of the image are delimited by border regions 101 and 102 for which no data is accessed from memory 50. Therefore, upon read-out of the image data from memory 50, border generator 62 supplements the 427×640 sub-array of pixel values read out from memory 50 with border color representative (e.g. black) pixel values to fill in regions 101 and 102 of the displayed image.

Figure 8:
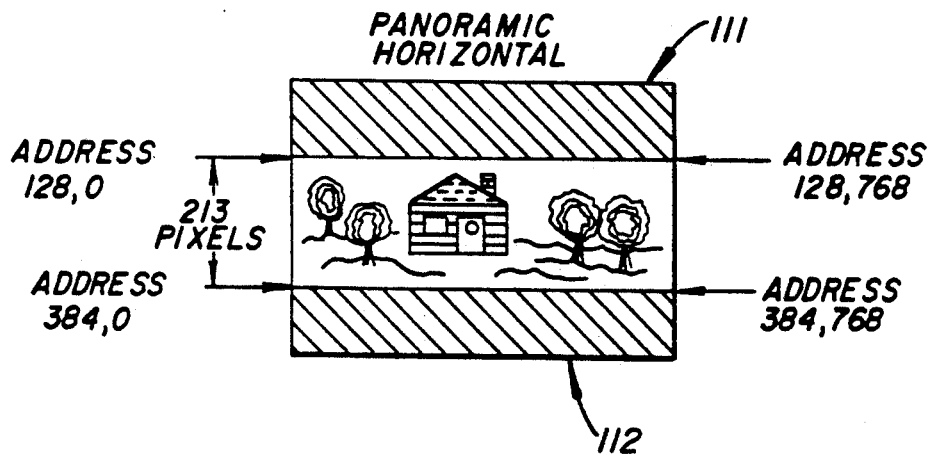
FIG. 8 illustrates the manner in which address decimation may be employed to display the entire horizontal dimension of a panoramic image having a 3:1 aspect ratio.

FIG. 8 illustrates the manner in which address decimation, similar to that employed for the image of FIG. 7, may be employed to automatically display the entire horizontal dimension of a panoramic image, such as one having a 3:1 aspect ratio, as indicated by the aspect ratio code 33=001 in FIG. 3. Here read-out of the stored image involves the same "six-to-five" decimation of the column and row addresses of memory 50, described above with reference to FIG. 7. Because of the 3:1 panoramic aspect ratio of the image, however, only the middle 256 rows of image data stored in memory 50 contain useful image data. When reading out the panoramic image from memory, using "six-to-five" decimation, border generator 62 supplements the 213×640 sub-array of pixel values read out from memory 50 with border color representative (e.f. black) pixel values to fill in regions 111 and 11 of the displayed image.

The aspect ratio code 33 shown in FIG. 3 can also be utilized when making a thermal print via printer 24 in FIG. 1. In the case of a panoramic 3:1 aspect ratio image, the printer can recognize that only the middle half of the rows of the 3:2 aspect ratio stored data file contain useful image data. The top and bottom rows of the stored data file will not be printed by thermal printer 24, thus conserving expensive print media, or allowing two 3:1 aspect ratio images to be printed next to one another in the same space normally used to print a single 3:2 aspect ratio image.

Figure 9:
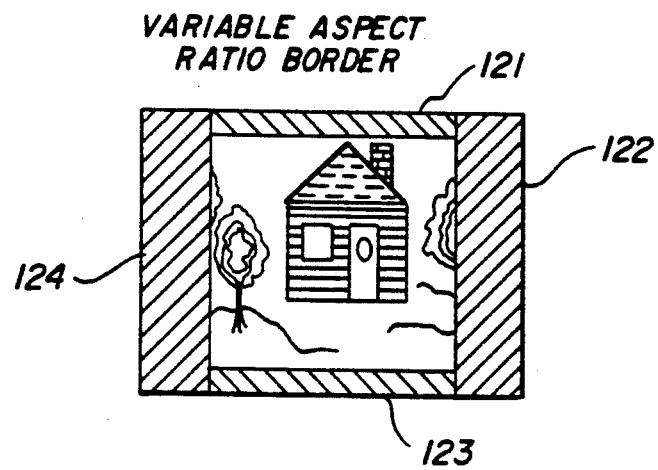
FIG. 9 shows a displayed image having a user-generated auxiliary border.

In addition to responding to control data from deformatter 42 based upon header orientation and aspect ratio codes, memory controller 46 may be coupled to respond to user-generated control signals for defining the limits of an auxiliary border to be injected onto the image output by border generator 62 via line 64, so that further cropping of selected portions of an image may be directed by the user, as shown by border regions 121, 122, 123 and 124 in FIG. 9 in order to alter the aspect ratio of the displayed image to provide a more pleasing composition.

One scheme for controlling an auxiliary border is described in co-pending U.S. patent application Ser. No. 405,816, filed Sept. 11, 1989, now abandoned by K. A. Parulski et al, entitled "A Digital Circuit for Creating Area Dependent Video Special Effects", assigned to the assignee of the present application and the disclosure of which is incorporated herein. In FIG. 4 of that application, a "window 1A" signal 120 may be used to drive signal line 64 of FIG. 4 of the present invention to create the auxiliary border of FIG. 9.

As will be appreciated from the foregoing description, by digitizing and storing film images in the manner they have been captured on film, the present invention is able to obviate the need to physically rotate the film scanner relative to the film for vertical images, thereby significantly reducing the complexity and cost of the scanner and simplifying the storage mechanism. Instead, the invention takes advantage of the information storage capability of the compact disc database and incorporates an additional presentation control file, so that images can be digitized and stored 'as is'. Since the presentation control file contains orientation and aspect ratio information, the image playback device will know how each image has been stored in the database. Subsequently, when the disc is inserted into a playback device for driving an output display such as a color TV monitor, the playback device is readily able to decode the header information in the course of reading out the digitized image, so that the image will be displayed in an upright orientation and at the correct aspect ratio for the display.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a digital image processing system in which images are digitized by an opto-electronic device for storage in a digital database, a method of storing said digitized images in said digital database comprising the steps of:
   (a) storing in said digital database respective image data files associated with each of said digitized images, each digitized image having an orientation and an aspect ratio; and
   (b) storing, together with each of the respective image data files stored in said digital database in step (a), a presentation control file which contains at least one of first data representative of the orientation of the associated digitized image as stored by said digital database and second data representative of the aspect ratio of the associated digitized image as stored by said digital database.

2. A method according to claim 1, wherein the contents of said respective presentation control file represent the orientation of the associated digitized image as stored by said digital database.

3. A method according to claim 1, wherein the contents of said respective presentation control file represent the aspect ratio of the associated digitized image as stored by said digital database.

4. A method according to claim 1, wherein the contents of said respective presentation control file include both said data representative of the orientation of and said second data representative of the aspect ratio of the associated digitized image as stored by digital database.

5. A method according to claim 1, further including the step of:
(c) reading out from said digital database image data representative of said digitized image stored in step (a) and coupling the read out image data to an image reproduction device in a manner that depends upon the contents of the associated presentation control file stored in step (b).

6. A method according to claim 5, wherein said image reproduction device comprises a television display, and wherein step (c) comprises coupling the read out image data to said television display such that the image reproduced by said television display has an upright orientation.

7. A method according to claim 6, wherein said television display displays said reproduced image at a spatial resolution which is different from a spatial resolution of the digitized image stored in step (a).

8. A method according to claim 7, wherein step (c) comprises controllably generating border image signals representative of image characteristics of at least one border region to be combined with said read out image data and coupling said border image signals to said television display, so that the reproduced image displayed thereby is bond by said at least one border region.

9. A method according to claim 8, wherein step (c) comprises controllably generating said border image signals in dependence upon the contents of said presentation control file.

10. A method according to claim 8, wherein step (c) comprises controllably generating border image signals exclusive of the contents of said presentation control file.

11. A method according to claim 1, wherein said digital database comprises an optical compact disk.

12. For use with a digital image processing system wherein a plurality of images, that have been captured on a photographic recording medium and may include horizontally and vertically oriented images, each image having an aspect ratio, are digitized into respective digital image data files, each digital image data file containing digital image data values associated with an array of pixels corresponding to a prescribed spatial resolution representation of a respective one of said plurality of images, a method of controlling the manner in which said digital image data files may be accessed for presentation to a reproduction device, so that a reproduced image may be viewed in an upright orientation comprising the steps of:
(a) digitizing each of said plurality of images in accordance with a prescribed orientation, irrespective of the actual orientation as captured by said photographic recording medium, and storing, in a digital database, each digitized image in a respective digital image data file; and
(b) storing, together with each of the respective digital image data files stored in said digital database in step (a), a presentation control file which contains at least one of first data representative of the actual orientation of the associated image as captured by said photographic recording medium and second data representative of the aspect ratio of the associated image as captured by said photographic recording medium.

13. A method according to claim 12, wherein the contents of said respective presentation control file include both first data representative of the orientation of and second data representative of the aspect ratio of the associated image as captured by said photographic recording medium.

14. A method according to claim 12, further including the step of:
(c) reading out from said digital database data representative of said digitized image stored in step (a) and causing said digitized image to be reproduced by said reproducing device in said upright orientation in accordance with the contents of the associated presentation control file stored in step (b).

15. A method according to claim 14, wherein step (c) comprises controllably generating border image signals representative of image characteristics of at least one border region to be combined with the digitized image and coupling said border image signals to said reproduction device, so that the image reproduced thereby is bounded by said at least one border region.

16. A method according to claim 12, wherein said digital database comprises an optical compact disk.

17. For use with a digital image processing system in which images are digitized by an opto-electronic device for storage in a digital database, an apparatus for storing digitized images in said digital database so as to facilitate reproduction of said digitized images by an image reproduction device, each digitized image having an orientation and an aspect ratio, comprising:
a digital recording unit which is operative to record digital data on said digital database; and
a digital recording control unit which is operative to cause said digital recording unit to store, in said digital database, respective data files associated with each of the images digitized by said opto-electronic device and, accompanying each of the respective data files stored on said digital database, a presentation control file which contains at least one of first data representative of the orientation of the associated image as digitized by said opto-electronic device and second data representative of the aspect ratio of the associated image.

18. An apparatus according to claim 17, wherein the contents of said respective presentation control file represent the orientation of the associated image.

19. An apparatus according to claim 17, wherein the contents of said respective presentation control file represent the aspect ratio of the associated image.

20. An apparatus according to claim 17, wherein the contents of said respective presentation control file include both said first data representative of the orientation and said second data representative of the aspect ratio of the associated image.

21. An apparatus according to claim 17, wherein said digital image processing system includes an image reproduction device, and wherein said apparatus further includes a reproduction control unit coupled to read data stored by said digitized image database and operative to read out, from said digital database, data representative of said digitized image stored thereby and to couple the read out data to said image reproduction device such that a digitized image is reproduced by said image reproduction device in a manner that depends upon the contents of the associated presentation control file.

22. An apparatus according to claim 21, wherein said image reproduction device comprises a television display, and wherein said reproduction control unit is operative to couple the read out data to said image reproduction device such that the image displayed by said television display has an upright orientation.

23. An apparatus according to claim 21, wherein said television display displays an image at a spatial resolution which is different from a spatial resolution of the digitized image stored in said digital database.

24. An apparatus according to claim 23, wherein said reproduction control unit is operative to controllably generate border image signals representative of image characteristics of at least one border region to be combined with said read out data and to couple said border image signals to said television display, so that the image displayed thereby is bounded by said at least one border region.

25. An apparatus according to claim 24, wherein said reproduction control unit is operative to controllably generate said border image signals in dependence upon the contents of said presentation control file.

26. An apparatus according to claim 24, wherein said reproduction control un it is operative to controllably generate border image signals exclusive of the contents of said presentation control file.

27. An apparatus according to claim 17, wherein said digital database comprises an optical compact disk.

28. For use with a digital image processing system wherein a plurality of images, that have been captured on a photographic recording medium and may include horizontally and vertically oriented images, each image having an aspect ratio, are digitized into respective digital image data files, each digital image data file containing data values associated with an array of pixels corresponding to a prescribed spatial resolution representation of a respective one of said plurality of images, an apparatus for controlling the manner in which said digital image data files may be accessed for presentation to an image reproduction device, so that an image reproduced thereby may be viewed in an upright orientation comprising:
 a digital recording unit which is operative to digitize each of said plurality of images in accordance with a prescribed orientation, irrespective of its actual orientation as captured by said photographic recording medium, and operative to store, in a digital database, each digitized image in a respective digital image data file; and
 a digital recording control unit which is operative to cause said digital recording unit to store, together with each of the respective digital image data files stored in said digital database, a presentation control file which contains at least one of first data representative of the actual orientation of the associated image as captured by said photographic recording medium and second data representative of the aspect ratio of the associated image as captured by said photographic recording medium.

29. An apparatus according to claim 28, wherein the contents of said respective presentation control file include both first data representative of the orientation of and second data representative of the aspect ratio of the associated image as captured by said photographic recording medium.

30. An apparatus according to claim 28, wherein said digital image processing system includes an image reproduction device, and wherein said apparatus further includes a reproduction control unit coupled to read data stored by said digitized image database and operative to read out, from said digital database, data representative of said digitized image stored thereby and to couple the read out data to said image reproduction device such that a digitized image is reproduced by said image reproduction device in a manner that depends upon the contents of the associated presentation control file.

31. An apparatus according to claim 30, wherein said reproduction control unit is operative to controllably generate border image signals representative of image characteristics of at least one border region to be combined with the digitized image and to couple said border image signals to said reproduction device, so that the image reproduced thereby is bounded by said at least one border region.

32. An apparatus according to claim 28, wherein said digital database comprises an optical compact disk.

33. For use with a digitized image processing system in which images, each of which has an orientation and aspect ratio, are converted by an opto-electronic device into digital format and stored as digitized image data files in a digital database, each of said digitized image data files containing digitized image data representative of the associated image as converted by said opto-electronic device into digital format, and a respective presentation control file for each of said respective data files, said respective presentation control file containing at least one of first data representative of the orientation of the associated image as stored by said digital database and second data representative of the aspect ratio of the associated image as stored by said digital database, a playback control apparatus for controlling the manner in which digitized images are accessed from said digital database for reproduction by an image reproduction device comprising:
 a digital data memory; and
 a digital data transfer unit which is operative to read out, from said digital database, digitized image data of a respective data file and to write the thus read out digitized image data into said digital data memory, and to controllably access digitized image data that has been written into said digital data memory in accordance with the contents of its associated presentation control file and to couple accessed data to an image reproduction device such that the reproduced image is reproduced by said image reproduction device in a manner that depends upon the contents of said associated presentation control file.

34. A playback control apparatus according to claim 33, wherein the contents of said respective presentation control file represent the orientation of the associated image as stored by said digital database.

35. A playback control apparatus according to claim 33, wherein the contents of said respective presentation control file represent the aspect ratio of the associated image as stored by said digital database.

36. A playback control apparatus according to claim 33, wherein the contents of said respective presentation control file include both said first data representative of the orientation of and said second data representative of the aspect ratio of the associated image as stored by said digital database.

37. A playback control apparatus according to claim 33, further including a border generator unit which is operative to controllably generate border image signals representative of image characteristics of at least one border region to be combined with read out digitized image data and to couple said border image signals to said reproduction device, so that the image reproduced thereby is bounded by said at least one border region.

38. A playback control apparatus according to claim 37, wherein said image reproduction unit comprises a television display, and wherein said digital data transfer unit is operative to couple read out data to said television display such that the image displayed by said television display has a upright orientation.

39. A playback control apparatus according to claim 33, wherein said digital database comprises an optical contact disk.

40. An arrangement for storing digitized images for use with a digital image processing system in which images, each of which has an orientation and an aspect ratio, are digitized by an opto-electronic device for storage as digitized image in a digital database, the contents of which may be selectively accessed for application to an image reproduction device for display of one or more digitized images, said arrangement comprising a compact digital data recording medium, as said digital database, said compact digital data recording medium containing a first plurality of storage locations in which digitized image data files respectively representative of digitized images output by said opto-electronic device are stored, said compact digital data recording medium further containing a second plurality of storage locations in which presentation control files respectively associated with said digitized images are stored, each presentation control file containing at least one of first data representative of the orientation of the associated image as stored by said compact digital data recording medium and second data representative of the aspect ratio of the associated image as stored by said compact digital data recording medium.

41. An arrangement according to claim 40, wherein the contents of said respective presentation control file represent the orientation of the associated image as stored by said compact digital data recording medium.

42. An arrangement according to claim 40, wherein the contents of said respective presentation control file represent the aspect ratio of its associated image as stored by said compact digital data recording medium.

43. An arrangement according to claim 40, wherein the contents of a respective presentation control file include both said first data representative of the orientation of and said second data representative of the aspect ratio of the associated image as stored by said compact digital data recording medium.

44. An arrangement according to claim 40, wherein said compact digital data recording medium comprises an optical compact disk.

* * * * *